US012572412B2

(12) United States Patent
Huang et al.

(10) Patent No.: US 12,572,412 B2
(45) Date of Patent: Mar. 10, 2026

(54) MANAGING ERROR CORRECTIONS FOR DATA STORAGE SYSTEMS

(71) Applicant: Macronix International Co., Ltd., Hsinchu (TW)

(72) Inventors: Yu-Ming Huang, Zhubei (TW); Yung-Chun Li, New Taipei (TW)

(73) Assignee: Macronix International Co., Ltd., Hsinchu (TW)

( * ) Notice: Subject to any disclaimer, the term of this patent is extended or adjusted under 35 U.S.C. 154(b) by 0 days.

(21) Appl. No.: 18/739,596

(22) Filed: Jun. 11, 2024

(65) Prior Publication Data

US 2025/0377972 A1      Dec. 11, 2025

(51) Int. Cl.
*G06F 11/10* (2006.01)

(52) U.S. Cl.
CPC ................................... *G06F 11/10* (2013.01)

(58) Field of Classification Search
CPC .... G06F 11/1048; G06F 11/10; G06F 3/0619; G06F 3/0632; G06F 3/064; G06F 3/0673
See application file for complete search history.

(56) References Cited

U.S. PATENT DOCUMENTS 9,100,054 B2      8/2015   Lee et al.
9,367,391 B2      6/2016   Lam 9,411,680 B2      8/2016   Kim
2016/0378595 A1   12/2016  Rho et al.
2020/0027444 A1   1/2020   Prabhavalkar et al.
2021/0055868 A1*  2/2021   Basu ..................... G06F 3/0679
2022/0182073 A1   6/2022   Lee et al.
2023/0267038 A1   8/2023   Chang et al.

FOREIGN PATENT DOCUMENTS

CN          102624403 A     8/2012
CN          111092620 B     1/2024
JP          2014-078229 A   5/2014
WO          WO-2022125101 A1 *  6/2022   .......... G06F 11/1048

* cited by examiner

*Primary Examiner* — Shelly A Chase
(74) *Attorney, Agent, or Firm* — Fish & Richardson P.C.

(57)                ABSTRACT

Systems, methods, and devices for managing error corrections for data storage systems are provided. In one aspect, a data storage system includes one or more data storage devices. A data storage device has at least one memory and a memory controller including at least one first Error-Correcting Code (ECC) decoder. The memory controller is configured to: read data from the at least one memory, perform an ECC test on the read data using the at least one first ECC decoder, and in response to determining that the read data fails to pass the ECC test, transmit the read data to an external device having at least one second ECC decoder for decoding the read data. The external device is external to the data storage device. The at least one second ECC decoder has a stronger ECC capability than the at least one first ECC decoder.

20 Claims, 9 Drawing Sheets

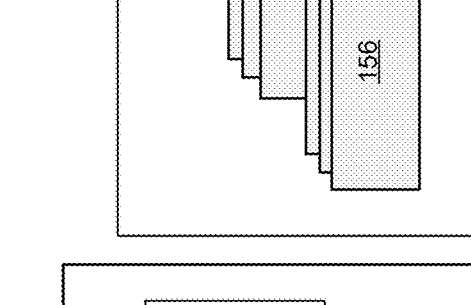
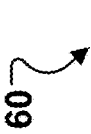
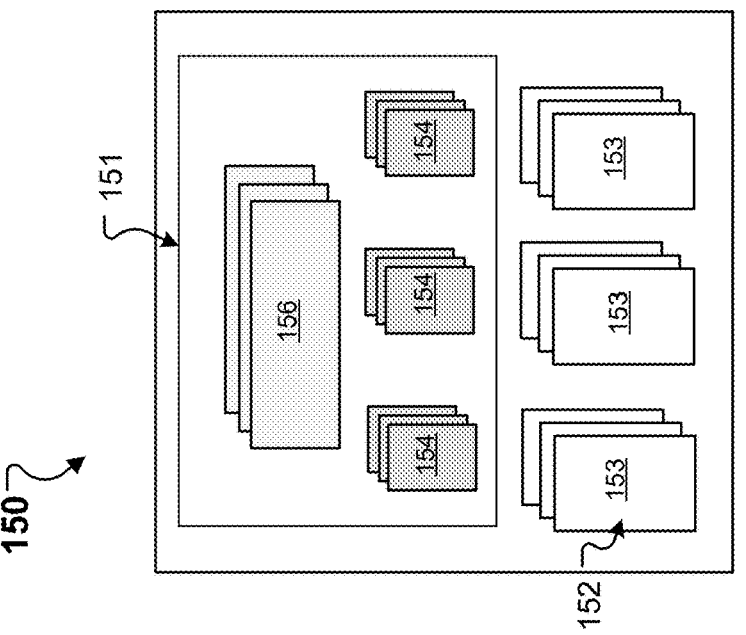
FIG. 1D
FIG. 1C
FIG. 1B

502 — Read request from host

504 — Read data from memory

506 — Weaker ECC Decoding

508 — ECC pass?

510 — Returning data to host

512 — Counter<X?

Yes, counter++

514 — Changing read sets or using soft decoding to reduce error bits

516 — Or depending on ECC feedback

518 — Stronger ECC Decoding

520 — ECC pass?

522 — Counter<Y?

Yes, counter++

524 — Triggering RAID for data recovery

500

MANAGING ERROR CORRECTIONS FOR DATA STORAGE SYSTEMS

TECHNICAL FIELD

The present disclosure is directed to data storage systems, e.g., error corrections for data storage systems.

BACKGROUND

Once storage cells in a data storage device, e.g., a memory device, are programmed, data can be read from the storage cells by sensing a programmed state of each memory cell by comparing a cell threshold voltage to one or more read voltages. However, the cell threshold voltage may change due to one or more factors, such as read disturbance or data retention, which may make the sensed programming states different from the written programmed states and cause failed bits in a reading output of the data.

SUMMARY

The present disclosure describes systems, devices, methods, and techniques for managing error corrections for data storage systems, e.g., a data storage system including multiple data storage devices such as solid-state drives (SSDs), high-density drivers (HDDs), NAND flash modules, a combination thereof.

One aspect of the present disclosure features a data storage system, including: one or more data storage devices; and a system controller coupled to the one or more data storage devices. The one or more data storage devices include a data storage device having at least one memory and a memory controller coupled to the at least one memory, the memory controller including at least one first Error-Correcting Code (ECC) decoder. The memory controller is configured to: read data from the at least one memory, perform a first ECC test on the read data using the at least one first ECC decoder, and in response to determining that the read data fails to pass the first ECC test, transmit the read data to an external device having at least one second ECC decoder for decoding the read data. The external device is external to the data storage device and the at least one second ECC decoder has a stronger ECC capability than the at least one first ECC decoder.

In some implementations, the at least one memory includes one or more memory chips.

In some implementations, the memory controller is configured to: in response to determining that the read data fails to pass the first ECC test and before transmitting the read data to the external device, determine whether a number of times that the read data fails to pass the first ECC test is smaller than a predetermined threshold, if the number of times is smaller than the predetermined threshold, change one or more read parameters to read the data again from the at least one memory or perform soft decoding on the data, and if the number of times reaches the predetermined threshold, transmit the read data to the external device including the at least one second ECC decoder for decoding the read data.

In some implementations, the memory controller is configured to: in response to determining that the read data fails to pass the first ECC test and before transmitting the read data to the at least one second ECC decoder, based on a result of the first ECC test, perform one of: i) changing one or more parameters for reading the data from the at least one memory or performing soft decoding on the data, and performing the first ECC test again using the at least one first ECC decoder, or ii) transmitting the read data to the external device including the at least one second ECC decoder for decoding the read data.

In some implementations, the external device is configured to: perform a second ECC test on the read data using the at least one second ECC decoder, and in response to determining that the read data passes the second ECC test, transmit corrected read data to the system controller.

In some implementations, the external device is configured to: in response to determining that the read data fails to pass the second ECC test, determine whether a number of times that the read data fails to pass the second ECC test is smaller than a predetermined threshold, if the number of times is smaller than the predetermined threshold, transmit a notification to the memory controller to i) change one or more parameters for reading the data from the at least one memory or ii) perform soft decoding on the data, and if the number of times reaches the predetermined threshold, trigger a RAID (redundant array of independent disks) circuit to perform an error correction on the read data.

In some implementations, the external device is configured to: in response to determining that the read data fails to pass the second ECC test and before triggering a RAID circuit, based on a result of the second ECC test, perform one of: i) changing one or more parameters for reading the data from the at least one memory or performing soft decoding on the data, and performing again at least one of the first ECC test using the at least one first ECC decoder or the second ECC test using the at least one second ECC decoder, or ii) triggering the RAID circuit to perform the error correction on the read data.

In some implementations, the RAID circuit is included in the memory controller and configured to perform the error correction on the read data within the data storage device.

In some implementations, the RAID circuit is included in the system controller and configured to perform the error correction on the read data within the one or more data storage devices.

In some implementations, the memory controller is configured to: execute an ECC decoding operation on the read data using the at least one first ECC decoder; determine whether a number of error bits in the read data after the ECC decoding operation is smaller than a predetermined threshold; if the number of error bits is smaller than the predetermined threshold, determine that the read data passes the first ECC test; and if the number of error bits is identical to or greater than the predetermined threshold, determine that the read data fails to pass the first ECC test.

In some implementations, the system controller is configured to: receive a command from a host device external to the data storage system, the command indicating reading the data from the one or more data storage devices, send the command to the data storage device to read the data, and in response to receiving corrected read data from the data storage device or the external device, transmit the corrected read data to the host device.

In some implementations, the external device is separate from the one or more data storage devices and coupled to the one or more data storage devices and the system controller.

In some implementations, the data storage device includes only the at least one first ECC decoder, without a second ECC decoder.

In some implementations, the external device includes only the at least one second ECC decoder, without a first ECC decoder.

In some implementations, a second data storage device of the one or more data storage devices includes the external device, and the second data storage device includes one or more first ECC decoders and the at least one second ECC decoder.

In some implementations, the one or more data storage devices including: one or more first data storage devices each including only one or more first ECC decoders, and one or more second data storage devices each including one or more first ECC decoders and one or more second ECC decoders.

In some implementations, the system controller is configured to: store a first type of data in the one or more first data storage devices, and store a second type of data in the one or more second data storage devices. The first type of data is configured to be read more frequently than the second type of data.

In some implementations, the one or more first data storage devices and the one or more second data storage devices are configured to operate under a protocol. Each of the one or more first data storage devices is configured to, in response to determining that the one or more first ECC decoders in the first data storage device fails to correct first data read from a corresponding first memory, transmit the read first data to one of the one or more second data storage devices. Each of the one or more second data storage devices is configured to, in response to receiving corresponding read data from one of the one or more first data storage devices, decode the corresponding read data using the one or more second ECC decoders in the second data storage device.

In some implementations, the external device is included in the system controller.

In some implementations, the data storage system further includes one or more external devices including the external device, each of the one or more external devices including one or more second ECC decoders.

In some implementations, the system controller is configured to generate an alert message for discarding the data storage device, based on at least one of a result of the first ECC test using the at least one first ECC decoder or a result of a second ECC test using the at least one second ECC decoder.

In some implementations, the memory controller includes a first ECC encoder configured to encode the data to generate first ECC data, and the memory controller is configured to store the data together with the first ECC data in the at least one memory. The at least one first ECC decoder is configured to decode the read data based on the first ECC data, and where the at least one second ECC decoder is configured to decode the read data based on the first ECC data.

In some implementations, the memory controller includes a first ECC encoder configured to encode the data to generate first ECC data, and the external device includes a second ECC encoder configured to encode the data to generate second ECC data. The memory controller is configured to: store the data together with the first ECC data and the second ECC data in the at least one memory, read the data together with the first ECC data and the second ECC data from the at least one memory, and in response to determining that the read data fails to pass the first ECC test, transmit the read data and the second ECC data to the external device having at least one second ECC decoder. The at least one first ECC decoder is configured to decode the read data based on the first ECC data, and where the at least one second ECC decoder is configured to decode the read data based on the second ECC data received from the memory controller.

In some implementations, the memory controller is configured to store first ECC data and the second ECC data as concatenated codes of the data in the at least one memory.

In some implementations, the system controller is configured to transmit multiple portions of particular data respectively to multiple data storage devices of the one or more data storage devices. Each of the multiple data storage devices includes a first ECC encoder and one or more first ECC decoders, and the first ECC encoder is configured to encode a corresponding portion of the particular data to generate corresponding first ECC data. The external device includes a second ECC encoder configured to encode the multiple portions of the particular data to generate second ECC data. Each of the multiple data storage devices includes a memory controller configured to store the corresponding portion of the particular data together with the corresponding first ECC data and the second ECC data in a corresponding memory. For each of the multiple data storage devices, the one or more first ECC decoders are configured to decode the corresponding portion of the particular data from the corresponding memory based on the corresponding first ECC data. The at least second ECC decoder in the external device is configured to: in response to receiving a portion of the particular data from one of the multiple data storage devices and the second ECC data, decode the portion of the particular data based on the second ECC data.

In some implementations, the at least one first ECC decoder and the at least one second ECC decoder include a same type of decoder with different ECC capabilities.

In some implementations, the at least one first ECC decoder and the at least one second ECC decoder include different types of decoders with different ECC capabilities.

In some implementations, the at least one first ECC decoder includes a low-power (LP) low-density parity check (LDPC) decoder, and the at least one second ECC decoder includes a min-sum (MS) LDPC decoder.

In some implementations, at least one of the at least one first ECC decoder or the at least one second ECC decoder is configured to perform Bose-Chaudhuri-Hocquenghem (BCH) decoding or LDPC decoding.

In some implementations, a first ECC decoder has a lower power consumption than a second ECC decoder.

Another aspect of the present disclosure features a data storage device, including: at least one memory and a memory controller coupled to the at least one memory. The memory controller includes at least one first Error-Correcting Code (ECC) decoder. The memory controller is configured to: read data from the at least one memory, perform a first Error-Correcting Code (ECC) test on the read data using the at least one first ECC decoder, and in response to determining that the read data fails to pass the first ECC test, transmit the read data to an external device having at least one second ECC decoder for decoding the read data. The external device is external to the data storage device and the at least one second ECC decoder has a stronger ECC capability than the at least one first ECC decoder.

In some implementations, the memory controller includes only the at least one first ECC decoder, without a second ECC decoder.

In some implementations, the memory controller is configured to: in response to determining that the read data fails to pass the first ECC test and before transmitting the read data to the external device, determine whether a number of times that the read data fails to pass the first ECC test is smaller than a predetermined threshold, if the number of times is smaller than the predetermined threshold, change one or more read parameters to read the data again from the at least one memory or perform soft decoding on the data, and if the number of times reaches the predetermined threshold, transmit the read data to the external device including the at least one second ECC decoder for decoding the read data.

Another aspect of the present disclosure features a device, including: at least one first Error-Correcting Code (ECC) decoder externally coupled to at least one data storage device that includes at least one memory configured to store data. The at least one data storage device includes at least one second ECC decoder, the at least one first ECC decoder having a stronger ECC capability than the at least one second ECC decoder. The at least one first ECC decoder is configured to: in response to receiving read data from the at least one data storage device, perform an ECC test on the read data using the at least one first ECC decoder, and in response to determining that the read data passes the ECC test, generate corrected read data for the at least one data storage device.

In some implementations, the device is configured to: in response to determining that the read data fails to pass the ECC test, determine whether a number of times that the read data fails to pass the ECC test is smaller than a predetermined threshold, if the number of times is smaller than the predetermined threshold, transmit a notification to the at least one data storage device to i) change one or more parameters for reading the data from the at least one memory or ii) perform soft decoding on the data, and if the number of times reaches the predetermined threshold, trigger a RAID (redundant array of independent disks) circuit to perform an error correction on the read data.

In some implementations, the at least one second ECC decoder is configured to decode the read data based on ECC data associated with the data stored in the at least one memory, and the at least one first ECC decoder is configured to decode the read data based on the ECC data.

In some implementations, the device further includes a first ECC encoder configured to encode the data to generate first ECC data and transmit the first ECC data to the at least one data storage device. The at least one data storage device includes a second ECC encoder configured to encode the data to generate second ECC data. The at least one data storage device is configured to: store the data together with the first ECC data and the second ECC data in the at least one memory, read the data together with the first ECC data and the second ECC data from the at least one memory, and in response to determining that the at least one second ECC decoder fails to decode the read data based on the second ECC data, transmit the read data and the first ECC data to the at least one first ECC decoder. The at least one first ECC decoder is configured to: in response to receiving the read data and the first ECC data from the at least one data storage device, decode the read data based on the first ECC data.

In some implementations, the data includes multiple portions, and the at least one data storage device includes multiple data storage devices configured to respectively store the multiple portions. The device further includes a first ECC encoder configured to encode the multiple portions of the data to generate first ECC data and transmit the first ECC data to each of the multiple data storage devices. Each of the multiple data storage devices includes a second ECC encoder configured to encode a corresponding portion of the data to generate corresponding second ECC data. Each of the multiple data storage devices is configured to store the corresponding portion of the data together with the corresponding second ECC data and the first ECC data in a corresponding memory. The at least first ECC decoder is configured to: in response to receiving a portion of the data from one of the multiple data storage devices and the first ECC data, decode the portion of the data based on the first ECC data.

Implementations of the above techniques include methods, systems, computer program products and computer-readable media. In one example, a method can be performed by a data storage system including a number of data storage devices and a system controller coupled to the data storage devices, and the method can include the above-described actions performed by the system controller and the data storage devices, e.g., the actions for managing error corrections for the data storage devices. In another example, one such computer program product is suitably embodied in a non-transitory machine-readable medium that stores instructions executable by one or more processors. The instructions are configured to cause the one or more processors to perform the above-described actions. One such computer-readable medium stores instructions that, when executed by one or more processors, are configured to cause the one or more processors to perform the above-described actions.

The details of one or more disclosed implementations are set forth in the accompanying drawings and the description below. Other features, aspects, and advantages will become apparent from the description, the drawings and the claims.

BRIEF DESCRIPTION OF THE DRAWINGS

FIG. 1B is a schematic diagram of an example of a first data storage device including both weaker ECC decoders and stronger ECC decoders.

FIG. 1C is a schematic diagram of an example of a second data storage device including only weaker ECC decoders.

FIG. 1D is a schematic diagram of an example of an external device including only stronger ECC decoders.

Like reference numbers and designations in the various drawings indicate like elements. It is also to be understood that the various exemplary implementations shown in the figures are merely illustrative representations and are not necessarily drawn to scale.

DETAILED DESCRIPTION

Figure 1A:
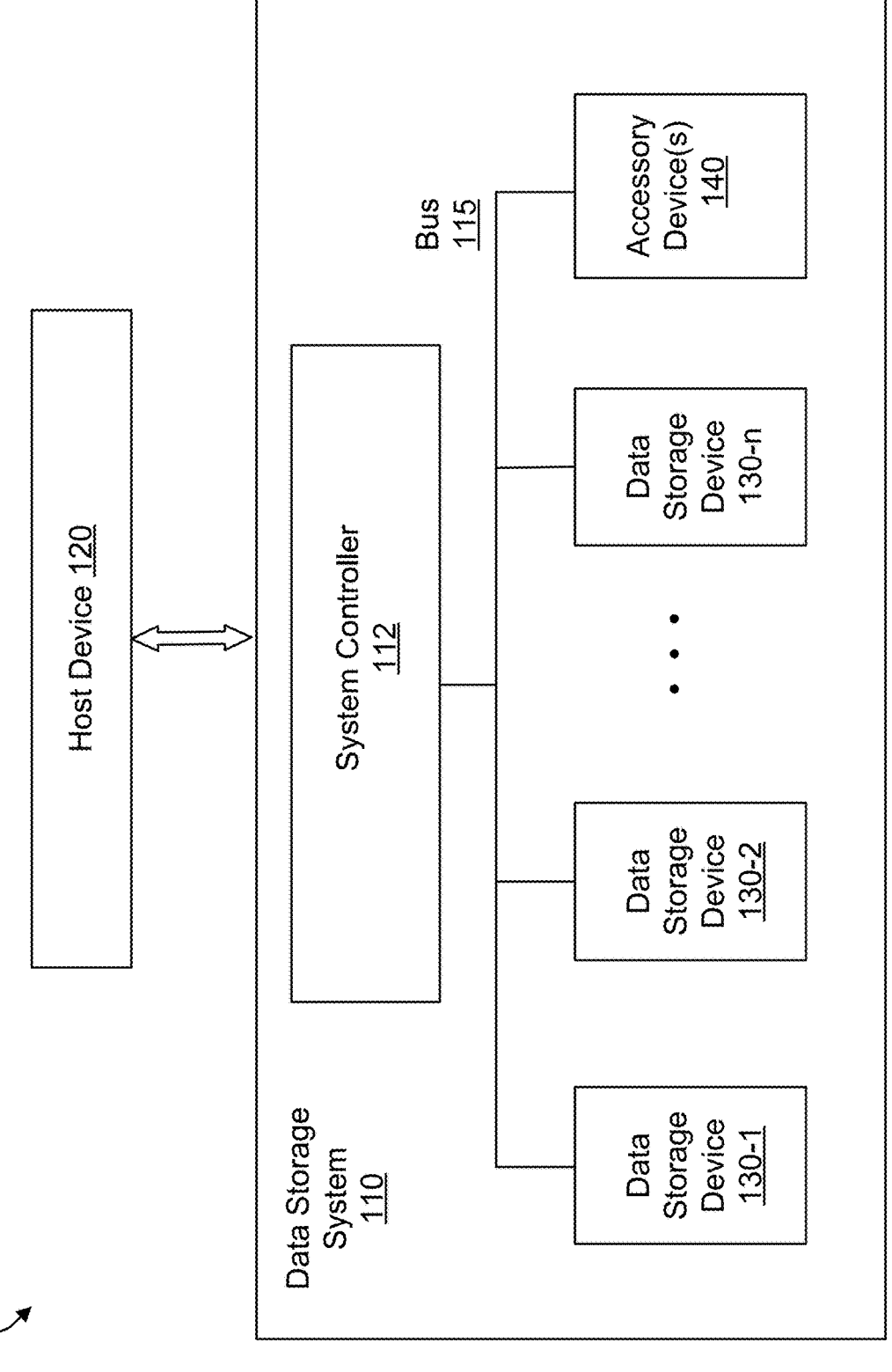
FIG. 1A is a schematic diagram of an example of a system including a data storage system.

Due to frequent read operations or long storage time, data stored in a memory may suffer from read disturbance or data retention, in which states of memory cells, e.g., an erased state and one or more programmed states, in the memory may have changed threshold voltages. The read disturbance or data retention may cause failed bits (or error bits) in reading outputs of the data. The problems become more severe in a data storage system including a number of data storage devices, e.g., SSDs, HDDs, flash modules, or a combination thereof.

To ensure correctness of the data, a number of approaches can be performed. In some cases, read optimization (or calibration) approaches, such as read retry, valley-tracking read, and machine learning-based read can be adopted to reduce error bits. In some cases, an error-correcting code (ECC) decoder can be configured to decode the data read from the memory to detect and correct, up to an error correction capability of an ECC scheme, any bit errors that may be present in the data.

In some cases, erasure coding is implemented in a storage system to enhance fault tolerance and recovery data from failures of memory chips and/or storage devices. In a storage system using erasure coding, data can be reconstructed even if a certain number of storage nodes become unavailable or experience data loss. This makes erasure coding valuable in distributed storage environments where hardware failures or network issues are common. While erasure coding offers compelling advantages, it comes with increased computational requirements. The encoding and decoding processes involve complex mathematical calculations, potentially impacting system performance. In some cases, RAID (redundant array of independent disks) is a data storage virtualization technology that combines multiple physical disk drive components into one or more logical units for data redundancy, performance improvement, or both. Different from ECC data being stored in a same page as user data, RAID redundant data are stored across different physical disk drive components. Thus, RAID can provide inter-page RAID or inter-disk RAID protection to recover ECC uncorrectable data as an additional protection. However, to perform the inter-page RAID or inter-disk RAID protection, all pages are read for the fail data, which takes much longer time to recover the data than the ECC. The probability of triggering RAID can be configured to be extremely low for a performance requirement of a data storage system.

To avoid long recovery time of the RAID procedure and/or high computational requirements for erasure coding, an error handling process of the data storage system can repeat the procedures of read optimization and ECC decoding iteratively with different parameter settings. To reduce the triggering rate of RAID and/or erasure coding efficiently, the error corrections of the read optimization and ECC decoding can be also improved. Generally, the read optimization and ECC decoding approaches are implemented on a device controller (e.g., SSD controller) of a data storage device (e.g., SSD). However, it takes huge hardware resources (e.g., gate count of ASIC in the SSD controller) to achieve high ECC capability. In some cases, a data storage device can include dual-mode ECC decoders, e.g., both weaker ECC decoders and stronger ECC decoders, to reduce overall hardware costs and power consumption of the ECC decoders. However, the hardware overhead of the stronger ECC decoders is still the major part for the device controller. Also, the power consumption of the stronger ECC decoders dominates the power consumption of the data storage device.

Implementations of the present disclosure provide techniques for managing error corrections for data storage systems, e.g., by providing i) cost-effective data storage devices with weaker built-in ECC decoders for most read requests and ii) one or more external devices with stronger ECC decoders guaranteeing a reliability of an overall data storage system. The techniques can be implemented with new error-correcting architectures for the data storage systems, which enable to reduce the cost of data storage devices (e.g., SSD) efficiently with identical (or similar) reliability for the whole data storage systems.

In some examples, a data storage system includes a rack cabinet or rackmount of storage system, which can include multiple data storage devices (e.g., SSDs or HDDs). In some examples, a data storage system is an all-flash array. A processing unit (e.g., FPGA or DPU) can be functioned as a controller for multiple memory chips (e.g., NAND flash memory chips), and a combination of the processing unit and the multiple memory chips can be considered as a storage module (or a flash module). The all-flash array can include multiple storage modules. The data storage system can include a system controller configured to manage data assignment among the multiple data storage devices or multiple storage modules, which can improve read/write performance and storage lifespans.

A data storage device (or a single storage module) can include built-in (or local) ECC decoders to detect and to correct error bits in one or more memories (e.g., NAND flash memory chips). The built-in (or local) ECC decoders can be implemented with only weaker ECC decoders that can be cheap with low power consumptions and small areas. If the weaker ECC decoders fail to decode read data from the one or more memories, the data storage device can transmit the read data to an external device in the data storage system. The external device can be considered as a reliability-guaranteed device or an accelerator. The external device can be external to the data storage device and includes stronger ECC decoders for decoding the read data. The stronger ECC decoders have a stronger ECC capability than the built-in (or local) ECC decoders. The built-in (or local) ECC decoders can handle most read requests with low power consumption, while the stronger ECC decoders guarantees the reliability of an overall data storage system. The number of the stronger ECC decoders can be expandable to improve the performance of end-of-life (EOL) of the overall data storage system. The data storage system can include one or more external devices each including one or more stronger ECC decoders.

An external device can be implemented by a field-programmable gate array (FPGA) device or any processing unit such as central processing unit (CPU), graphics processing unit (GPU), data processing unit (DPU), or a complete SSD. In a data storage system, the data storage devices or flash modules (e.g., SSDs or NAND flash modules) are consumable because of their limited lifespan (e.g., endurance, total bytes written (TBW)). Thus, implementing the data storage devices or flash modules with lower-cost weaker ECC decoders can lower down the cost of the data storage devices or flash modules, which can reduce total cost of ownership (TCO) of the data storage system efficiently. The techniques enable to move the major burden (e.g., stronger ECC decoders) of SSD/flash modules out and rely on an external device to remain the reliability of the whole data storage system. By doing so, the cost of consumable part is reduced significantly for the whole data storage system. Moreover, improving the read performance under end of life devices is feasible by adding the stronger ECC decoders in the external device. Further, the read optimization approaches can be done locally or globally with the assistance of the external device having the stronger ECC decoders, such as a machine learning based read optimization which is online inference by the external device.

Figure 2:
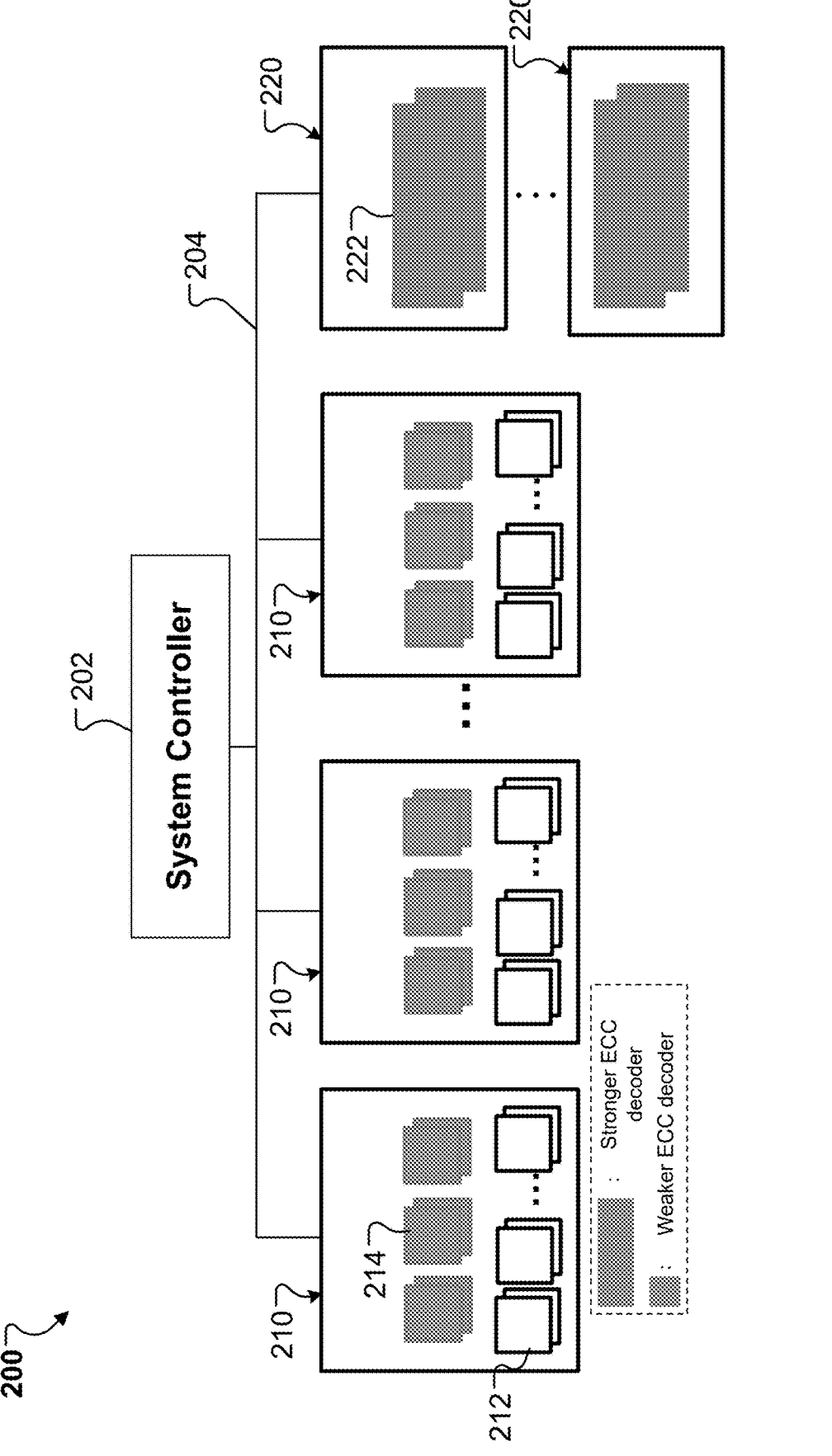
FIG. 2 is a schematic diagram of an example of a data storage system including one or more external devices having stronger ECC decoders for data storage devices having only weaker ECC decoders.

In some implementations, e.g., as illustrated with further details in FIG. 2, the external device is external to the data storage devices and the system controller, but is coupled to the data storage devices and the system controller. In some implementations, e.g., as illustrated with further details in FIG. 4, the external device is included in the system controller.

Figure 3:
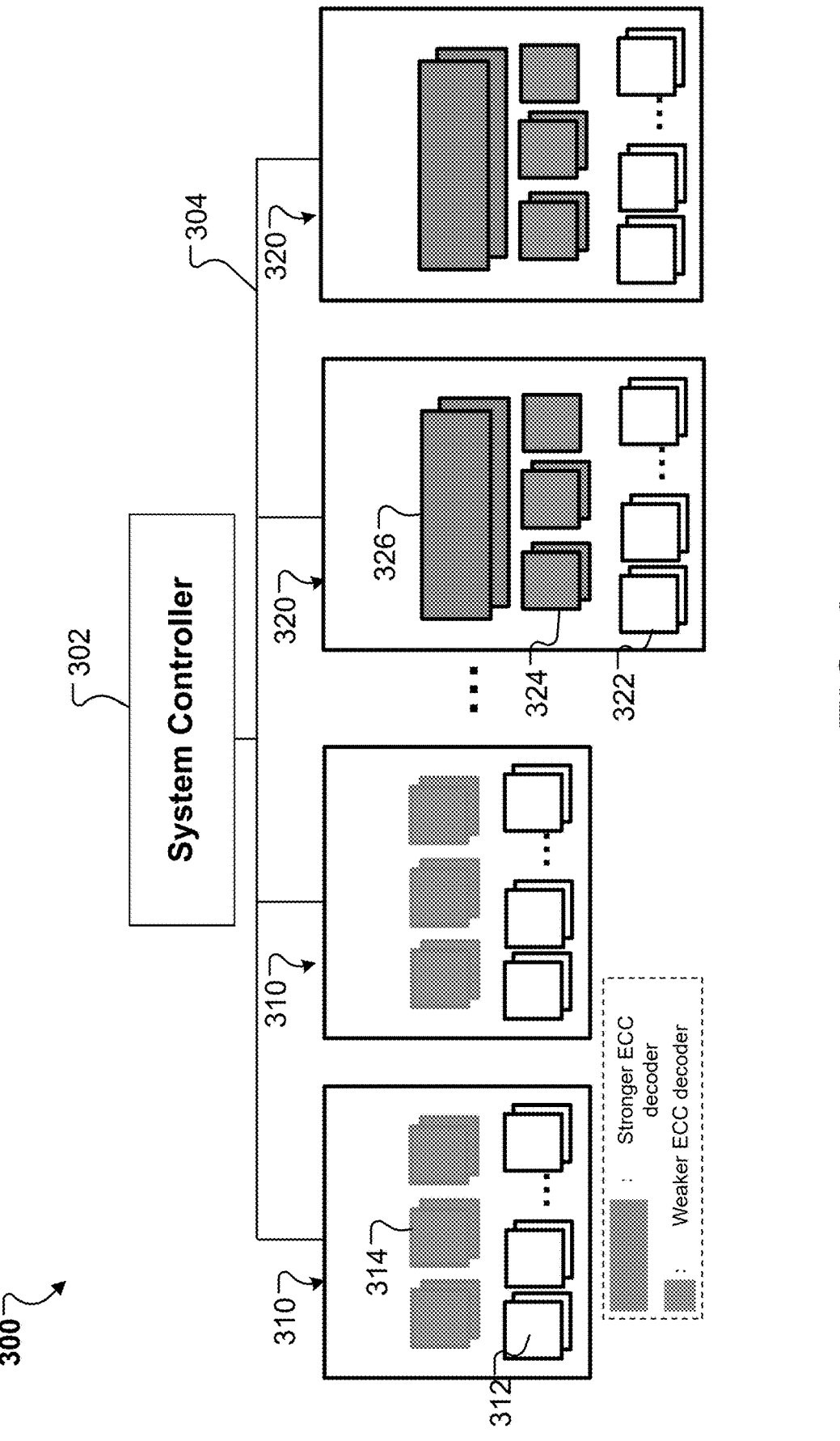
FIG. 3 is a schematic diagram of another example of a data storage system including data storage devices having stronger ECC decoders for data storage devices having only weaker ECC decoders.

In some implementations, e.g., as illustrated with further details in FIG. 3, the external device is integrated in a data storage device having its own memory chips and offering the functionality of a normal data storage device (e.g., a normal SSD, HDD, or NAND flash module). The data storage device can include only the stronger ECC decoders, or include dual-mode ECC decoders (e.g., both weaker ECC decoders and stronger ECC decoders). The data storage device can help decoding of failure data in other data storage devices having only weaker ECC decoders. In some cases, a data storage system includes one or more first data storage devices having only weaker ECC decoders and one or more second data storage devices having stronger ECC decoders and optionally weaker ECC decoders. The data storage system can store hot data (e.g., data read more often) in the one or more first data storage devices with more frequent replacement and store cold data (e.g., data read less frequently) in the one or more second data storage devices with less frequent replacement, which can decrease total cost of ownership (TCO) of the data storage system. The data storage system can include a protocol between the one or more first data storage devices and the one or more second data storage devices to let stronger ECC decoders in the one or more second data storage devices help decoding of failure data in the one or more first data storage devices.

In the present disclosure, a weaker ECC decoder represents an ECC decoder with a weaker ECC capability that has lower power consumption and lower cost, compared to a stronger ECC decoder with a stronger ECC capability that has higher power consumption and higher cost. In some examples, a weaker ECC decoder is an ECC decoder with an ECC capability lower than a specified threshold for a data storage device, and a stronger ECC decoder is an ECC decoder with an ECC capability identical to or higher than the specified threshold. In some examples, a weaker ECC decoder and a stronger ECC decoder are a same type of decoder with different ECC capabilities. For example, the weaker ECC decoder can be a low-power (LP) low-density parity check (LDPC) decoder, and the stronger ECC decoder can be a min-sum (MS) LDPC decoder. In some examples, a weaker ECC decoder and a stronger ECC decoder are different types of decoder with different ECC capabilities. For example, the weaker ECC decoder can be a Bose-Chaudhuri-Hocquenghem (BCH) decoder, and the stronger ECC decoder can be a LDPC decoder. ECC codes are not limited to LDPC codes, any linear block ECC such as algebraic codes, concatenated codes, product codes can be used in the present disclosure.

In some examples, a same ECC decoder (e.g., an LDPC decoder) can be configured to be a weaker ECC decoder or a stronger ECC decoder. For example, an ECC encoder is configured to encode data with a predetermined length or size (e.g., 4 KB) to generate ECC data with a predetermined size (e.g., 512 B). The ECC data can include ECC parity bits. An ECC decoder is configured to decode data with a predetermined length or size (e.g., 4 KB) using ECC data with a predetermined size (e.g., 512 B). For same size data, a larger size ECC data can provide a higher error correction capability (or ECC capability) than a smaller size ECC data. For same size ECC data, the ECC data can provide a higher error correction capability for smaller size data than larger size data. For example, a 4 KB ECC encoder generates 512 B ECC data. If the ECC encoder is used to encode 2 KB data and 2 KB predetermined (or fixed) values (e.g., 1 or 0) to generate 512 B ECC data. When the ECC decoder decodes data using the ECC data, the 512 B ECC data generated based on the 2 KB data can provide a higher error correction capability than 512 B ECC data generated based on 4 KB data.

The techniques can be applied to various types of semiconductor devices, volatile memory devices, or non-volatile memory (NVM) devices, such as NAND flash memory, NOR flash memory, resistive random-access memory (RRAM), phase-change memory (PCM) such as phase-change random-access memory (PCRAM), spin-transfer torque (STT)-Magnetoresistive random-access memory (MRAM), among others. The techniques can also be applied to charge-trapping based memory devices, e.g., silicon-oxide-nitride-oxide-silicon (SONOS) memory devices, and floating-gate based memory devices. The techniques can be applied to two-dimensional (2D) memory devices or three-dimensional (3D) memory devices. The techniques can be applied to various memory types, such as SLC (single-level cell) devices, MLC (multi-level cell) devices like 2-level cell devices, TLC (triple-level cell) devices, QLC (quad-level cell) devices, or PLC (penta-level cell) devices. Additionally or alternatively, the techniques can be applied to various types of devices and systems, such as secure digital (SD) cards, embedded multimedia cards (eMMC), or solid-state drives (SSDs), embedded systems, among others. The techniques can be applied to SSDs or HDDs-based storage systems or all-flash arrays.

FIG. 1A is a schematic diagram of an example of a system 100 including a data storage system 110 and a host device 120. The data storage system 110 can include a system controller 112 and a number of data storage devices 130-1, 130-2, . . . , 130-n (referred to generally as data storage devices 130 and individually as data storage device 130), where n is an integer no smaller than 1. The system controller 112 and the data storage devices 130 can be coupled to a communication bus 115, through which the system controller 112 can communicate with each of the data storage device 130 and the data storage devices 130 themselves can also communicate with one another. In some examples, the communication bus 115 includes a Peripheral Component Interconnect Express (PCIe) based bus or interface. In some implementations, the system controller 112 and the data storage devices 130 communicate wirelessly or by wires.

The system controller 112 is configured to manage data assignment among the data storage devices 130. For example, the system controller 112 can receive data and a write command from the host device 120 and store the data in one or more data storage devices 130. The system controller can also receive a read command from the host device 120 to read data from one or more data storage devices 130.

The host device 120 includes a host controller that can include at least one processor and at least one memory coupled to the at least one processor and storing programming instructions for execution by the at least one processor to perform one or more corresponding operations. The system controller 112 can include at least one memory and at least one processor configured to execute instructions and process data in the at least one memory. The instructions can include firmware instructions and/or other program instructions that are stored as firmware code and/or other program code, respectively. The data includes program data corresponding to the firmware and/or other programs executed by the at least one processor, among other suitable data. In some implementations, the at least one processor is a general-purpose microprocessor, or an application-specific micro-controller, e.g., CPU, GPU, or DPU.

A data storage device 130 can be a solid-state drive (SSD), an embedded multimedia card (eMMC), a secure digital (SD) card, a flash module (e.g., NAND flash memory module), or any other suitable storage device. As discussed with further details below, the data storage devices 130 can be same or different from one another, e.g., as illustrated in FIG. 3.

In some implementations, the data storage device 130 includes a memory controller and one or more memories. Each memory can include one or more memory chips (e.g., NAND flash memory chips). The memory controller is configured to receive data and instructions from and to send data to the system controller 112. The memory controller can be further configured to send data and commands to the one or more memories and to receive data from the one or more memories. For example, the memory controller can be configured to send data and a write command to instruct the one or more memories to store the data to a specified address. As another example, the memory controller can be configured to receive a read request (or a read command) from the system controller 112 and send a corresponding read command to the one or more memories to read data from a specified address in the one or more memories.

In some implementations, the memory controller includes one or more ECC encoders and one or more ECC decoders. In some implementations, the one or more ECC encoders and the one or more ECC decoders can be also arranged to be externally coupled to the memory controller. An ECC encoder can be configured to receive data to be stored in a memory and to generate check bits, e.g., by encoding the data using an ECC encoding scheme. The check bits can be referred to as ECC data. The ECC encoder can include a Reed Solomon encoder, a Bose-Chaudhuri-Hocquenghem (BCH) encoder, a low-density parity check (LDPC) encoder, or any combination thereof. An ECC decoder can be configured to decode data read from the memory to detect and correct, up to an error correction capability of the ECC scheme, any bit errors that may be present in the data. The ECC decoder can perform BCH decoding or LDPC decoding. The ECC decoder can be a BCH decoder, a low-power (LP) LDPC decoder, or a min-sum (MS) LDPC decoder. The ECC decoder can use any linear block ECC such as algebraic codes, concatenated codes, product code, etc.

In some implementations, the data storage system 110 includes a RAID circuit (or RAID circuitry) configured to protect data using RAID technology. The RAID circuit can distribute data across different disk drives within a data storage device 130, or between multiple data storage devices 130. The RAID circuit can be configured to provide a further phase error protection if read optimization and ECC protections in the data storage system 110 fail.

FIG. 1B is a schematic diagram of an example of a first data storage device 150 including both weaker ECC decoders and stronger ECC decoders. The first data storage device 150 can be an SSD, an HDD, or a NAND flash module.

The first data storage device 150 can be implemented as the data storage device 130 of FIG. 1A. The first data storage device 150 can include one or more memories 152 and a memory controller 151. Each of the one or more memories 152 can include one or more memory chips 153, e.g., a NAND flash memory chip. The memory controller 151 can include one or more first ECC decoders 154 (e.g., weaker ECC decoders) and one or more second ECC decoders 156 (e.g., stronger ECC decoders). A second ECC decoder can have a stronger ECC capacity than a first ECC decoder. When the one or more first ECC decoders 154 fail to decode data read from the one or more memories 152, the memory controller 151 can control the one or more second ECC decoders 156 to decode the read data, within the first data storage device 150.

FIG. 1C is a schematic diagram of an example of a second data storage device 160 including only weaker ECC decoders. The second data storage device 160 can be an SSD, an HDD, or a NAND flash module. The second data storage device 160 can be implemented as the data storage device 130 of FIG. 1A.

Similar to the first data storage device 150 of FIG. 1B, the second data storage device 160 can include a memory controller 161 and one or more memories 152. Different from the memory controller 151 of FIG. 1B, the memory controller 161 can include only one or more first ECC decoders 154 (e.g., weaker ECC decoders), without any other ECC decoders like the second ECC decoders 156. As discussed with further details in FIGS. 2-5, if the one or more first ECC decoders 154 fail to decode data read from the one or more memories 152, the memory controller 161 can transmit the read data to an external device including stronger ECC decoders (e.g., the second ECC decoders 156). The external device is external to the second data storage device 160.

FIG. 1D is a schematic diagram of an example of an external device 170 including only stronger ECC decoders. The external device 170 can be considered as a reliability-guaranteed device or an accelerator. The external device 170 can include only stronger ECC decoders for decoding read data. The external device 170 can include a controller configured to control the stronger ECC decoders. The stronger ECC decoders can be second ECC decoders 156 that can be same as the second ECC decoders 156 of FIG. 1B. The stronger ECC decoders have a stronger ECC capability than built-in (or local) ECC decoders, e.g., the first ECC decoders 154 in the data storage device 150 of FIG. 1B or in the data storage device 160 of FIG. 1C. The external device 170 can be implemented by a field-programmable gate array (FPGA) device or any processing unit such as central processing unit (CPU), graphics processing unit (GPU), data processing unit (DPU), or a complete SSD.

In some implementations, e.g., as discussed with further details in FIG. 2, the external device 170 can be external to the data storage devices 130 (e.g., the second data storage device 160 of FIG. 1C) and the system controller 112. In some implementations, e.g., as discussed with further details in FIG. 3, the external device 170 can be one of the data storage device 130 or be included in one of the data storage devices 130 (e.g., the first data storage device 150 of FIG. 1B). In some implementations, e.g., as discussed with further details in FIG. 4, the external device 170 can be included in the system controller 112.

As illustrated in FIG. 1A, the data storage system 110 can include one or more accessory devices 140 that can be coupled to the data storage devices 130 and the system controller 112 through the bus 115. In some implementations, the one or more accessory device 140 include one or more external devices 170 of FIG. 1D that each can include one or more stronger ECC decoders (e.g., the second ECC decoders 156 of FIG. 1B or 1D). If a data storage device 130 (e.g., the data storage device 160 of FIG. 1C) in the data storage system 110 fails to decode read data using its built-in ECC decoders (e.g., the first ECC decoders 154 of FIG. 1C), the data storage device 130 can transmit the read data to the one or more accessory devices 140 that can use the one or more stronger ECC decoders to decode the read data.

FIG. 2 is a schematic diagram of an example of a data storage system 200 including one or more external devices 220 having stronger ECC decoders 222 for data storage devices 210 having only weaker ECC decoders 214. The data storage system 200 can be implemented as the data storage system 110 of FIG. 1A. The data storage system 200 includes a system controller 202 (e.g., the system controller 112 of FIG. 1A) in communication with the data storage devices 210 through a bus 204 (e.g., the communication bus 115 of FIG. 1A). The data storage devices 210 and the one or more external devices 220 can also communicate with one another through the bus 204.

Each of the data storage devices 210 can be the data storage device 160 of FIG. 1C that includes only one or more weaker ECC decoders 214 (e.g., the first ECC decoders 154 of FIG. 1B or 1C). Each of the one or more external devices 220 can be the external device 170 of FIG. 1D and can include only one or more stronger ECC decoders 222 (e.g., the second ECC decoders 156 of FIG. 1B or 1D). If the one or more weaker ECC decoders 214 fail to decode data read from the one or more memories 212, the data storage device 210 can transmit the read data to the one or more external devices 220 for decoding the read data up to their ECC capabilities using the one or more stronger ECC decoders 222.

Compared to a data storage system including all the first data storage devices 150 of FIG. 1B, the data storage system 200 includes the data storage devices 210 with lower costs and lower power consumption due to having only the weaker ECC decoders 214 and the one or more external devices 220 with the stronger ECC decoders 222. The weaker ECC decoders 214 are configured to handle most read requests with low power consumption in the data storage device 210, and the one or more external devices 220 are configured to guarantee the reliability of the overall data storage system 200 by the stronger ECC decoders 222. The number of the stronger ECC decoders 222 and/or the number of the external devices 220 can be expandable to improve the performance of end-of-life (EOL) of the data storage system 200.

FIG. 3 is a schematic diagram of another example of a data storage system 300 including data storage devices having stronger ECC decoders for data storage devices having only weaker ECC decoders. The data storage system 300 can be implemented as the data storage system 110 of FIG. 1A. The data storage system 300 includes a system controller 302 (e.g., the system controller 112 of FIG. 1A) in communication with the first data storage device 310 and the second data storage devices 320 through a bus 304 (e.g., the communication bus 115 of FIG. 1A). The first data storage devices 310 and the second data storage devices 320 can also communicate with one another through the bus 304.

Each of the second data storage devices 320 can be the first data storage device 150 of FIG. 1B and can include both weaker ECC decoders 324 (e.g., the first ECC decoders 154 of FIG. 1B or FIG. 1C) and stronger ECC decoders 326 (e.g., the second ECC decoders 156 of FIG. 1B or 1D). When the weaker ECC decoders 324 fail to decode data read from one or more memories 322 (e.g., the one or more memories 152 of FIG. 1B or 1C), the stronger ECC decoders 326 in the second data storage device 320 can decode the read data, within the second data storage device 320 itself.

Each of the first data storage devices 310 can be the data storage device 160 of FIG. 1C that includes only one or more weaker ECC decoders 314 (e.g., the first ECC decoders 154 of FIG. 1B or FIG. 1C). When the weaker ECC decoders 314 fail to decode data read from one or more memories 312 (e.g., the one or more memories 152 of FIG. 1B or 1C) in a first data storage device 310, the first data storage device 310 can be configured to transmit the read data to one or more second data storage devices 320 for decoding the read data, using the stronger ECC decoders 326 in the one or more second data storage devices 320.

The data storage system 300 can include a protocol between the first data storage devices 310 and the second data storage devices 320 to let stronger ECC decoders 326 in the one or more second data storage devices 320 help decoding of failure data in the one or more first data storage devices 310. For example, each of the one or more first data storage devices 310 is configured to, in response to determining that the weaker ECC decoders 314 in the first data storage device 310 fails to correct first data read from a corresponding first memory 312, transmit the read first data to one of the one or more second data storage devices 320 for decoding. Each of the one or more second data storage devices 320 is configured to, in response to receiving corresponding read data from one of the one or more first data storage devices 310, decode the corresponding read data using the one or more stronger ECC decoders 326 in the second data storage device 320.

In some implementations, the system controller 302 can be configured to store a first type of data (e.g., hot data) in one or more first data storage devices 310, and store a second type of data (e.g., cold data) in one or more second data storage devices 320. The first type of data can be data to be read more frequently than the second type of data. In such a way, the data storage system 300 can decrease the total cost ownership (TCO), as the first data storage device 310 is much cheaper than the second data storage device 320 and can be replaced more frequently than the second data storage device 320.

Figure 4:
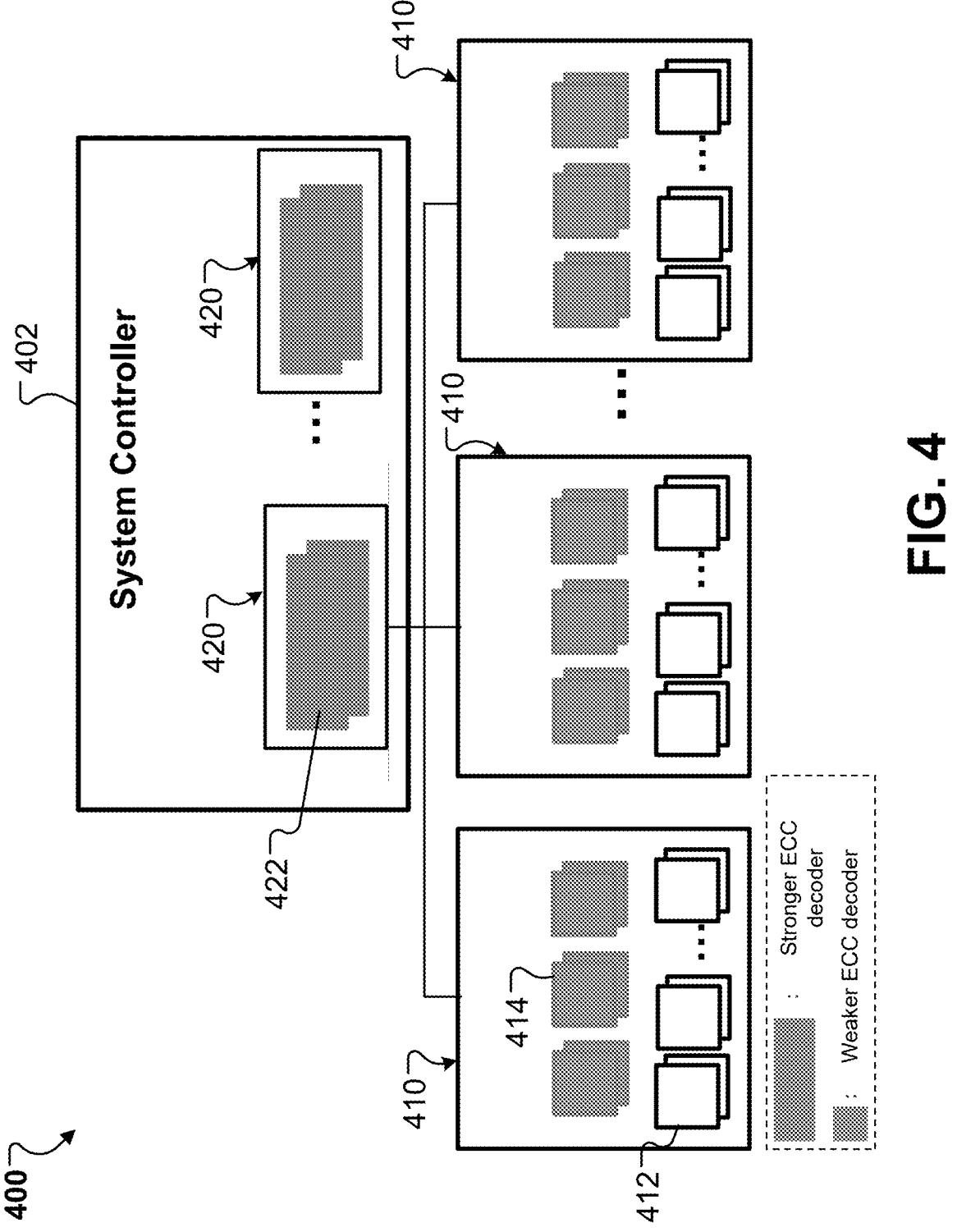
FIG. 4 is a schematic diagram of another example of a data storage system including a system controller that includes one or more external devices having stronger ECC decoders for data storage devices.

FIG. 4 is a schematic diagram of another example of a data storage system 400 including a system controller 402 that includes one or more external devices 420 having stronger ECC decoders 422 for data storage devices 410. The data storage system 400 can be implemented as the data storage system 110 of FIG. 1A.

Similar to the data storage system 200 of FIG. 2, each of the data storage devices 410 can be the data storage device 160 of FIG. 1C, the data storage device 210 of FIG. 2, or the first data storage device 310 of FIG. 3. The data storage device 410 can include only one or more weaker ECC decoders 414 (e.g., the first ECC decoders 154 of FIG. 1B or 1C, 214 of FIG. 2, or 314 of FIG. 3). Each of the one or more external devices 420 can be the external device 170 of FIG. 1D or 220 of FIG. 2 and can include only one or more stronger ECC decoders 422 (e.g., the second ECC decoders 156 of FIG. 1B or 1D, 222 of FIG. 2, 326 of FIG. 3). If weaker ECC decoders 414 in the data storage device 410 fail to decode data read from one or more memories 412 (e.g., the memory 152 of FIG. 1B or 1C, 212 of FIG. 2, or 312 or 322 of FIG. 3), the data storage device 410 can transmit the read data to the one or more external devices 420 for decoding the read data up to their ECC capabilities using the one or more stronger ECC decoders 422.

Different from the data storage system 200 of FIG. 2 where the one or more external devices 220 is external to the system controller 202, in the data storage system 400, the one or more external devices 420 can be included in the system controller 402. The number of the one or more external devices 420 can be increased to improve an overall read performance of the data storage system 400.

Figure 5:
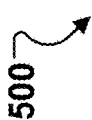
FIG. 5 is a flowchart of an example process of managing error corrections in a data storage system.

FIG. 5 is a flowchart of an example process 500 of managing error corrections in a data storage system. The data storage system can be the data storage system 110 of FIG. 1A, the data storage system 200 of FIG. 2, the data storage system 300 of FIG. 3, or the data storage system 400 of FIG. 4. The data storage system can include a system controller and one or more data storage devices. The system controller can be, e.g., the system controller 112 of FIG. 1A, the system controller 202 of FIG. 2, the system controller 302 of FIG. 3, or the system controller 402 of FIG. 4. A data storage device can be, e.g., the data storage device 130 of FIG. 1A, the data storage device 150 of FIG. 1B, the data storage device 160 of FIG. 1C, the data storage device 210 of FIG. 2, the first data storage device 310 of FIG. 3, the second data storage device 320 of FIG. 3, or the data storage device 410 of FIG. 4.

At step 502, the system controller receives a read request from a host device (e.g., the host device 120 of FIG. 1A). The read request can be a read command for reading data from one or more data storage devices in the data storage system. The system controller can transmit the read command to the one or more data storage devices.

At step 504, in response to receiving the read command from the system controller by a data storage device, a memory controller (e.g., the memory controller 161 of FIG. 1C) in the data storage device reads data from at least one memory (e.g., the memory 152 of FIG. 1C, the memory 212 of FIG. 2, the memory 312 of FIG. 3, or the memory 412 of FIG. 4) in the data storage device. The memory controller can include at least one first ECC decoder that can be a weaker ECC decoder., e.g., the ECC decoder 154 of FIG. 1B or 1C, the ECC decoder 214 of FIG. 2, the ECC decoder 314 of FIG. 3, or the ECC decoder 414 of FIG. 1C).

At step 506, the memory controller performs weaker ECC decoding in the data storage device using the at least one first ECC decoder, and determines whether the read data passes a first ECC test at step 508. In some implementations, the memory controller executes an ECC decoding operation on the read data using the at least one first ECC decoder. In some implementations, the memory controller includes a first ECC encoder configured to encode the data to generate first ECC data (e.g., ECC parity bits), and the memory controller can store the data together with the first ECC data in the at least one memory and read the data together with the first ECC data from the at least one memory. The at least one first ECC decoder can decode the data read from the at least one memory using the first ECC data.

The memory controller can determine whether the read data passes the first ECC test by determining whether a number of error bits in the read data after the ECC decoding operation is smaller than a predetermined threshold. If the number of error bits is smaller than the predetermined threshold, the memory controller can determine that the read data passes the first ECC test. If the number of error bits is identical to or greater than the predetermined threshold, the memory controller determines that the read data fails to pass the first ECC test.

If the memory controller determines that the read data passes the first ECC test, at step 510, the memory controller returns corrected read data to the system controller that transmits the corrected read data to the host device.

If the memory controller determines that the read data fails to pass the first ECC test, at step 512, the memory controller determines whether a number of times that the read data fails to pass the first ECC test is smaller than a predetermined threshold, e.g., by comparing a counter of the number of times to a predetermined number. If the number of times is smaller than the predetermined threshold, at step 514, the memory controller changes one or more read parameters to read the data again from the at least one memory or perform soft decoding on the data (at step 504). Accordingly, the counter can be increased by 1.

If the number of times reaches the predetermined threshold, the memory controller transmits the read data to an external device including at least one second ECC decoder for stronger ECC decoding. The external device can be, e.g., the external device 170 of FIG. 1D, the external device 220 of FIG. 2, the second data storage device 320 of FIG. 3, or the external device 420 of FIG. 4 in the system controller. The at least one second ECC decoder can be, e.g., the second ECC decoder 156 of FIG. 1B, the second ECC decoder 156 of FIG. 1D, the stronger ECC decoder 222 of FIG. 2, the stronger ECC decoder 326 of FIG. 2, or the stronger ECC decoder 422 of FIG. 4. The at least one second ECC decoder in the external device can have a stronger ECC capability than the at least one first ECC decoder in the data storage device.

In some implementations, additional or alternative to step 512, in response to determining that the read data fails to pass the first ECC test and before transmitting the read data to the at least one second ECC decoder, the memory controller can, based on a result of the first ECC test, perform one of: i) changing one or more parameters for reading the data from the at least one memory or performing soft decoding on the data, and performing the first ECC test again using the at least one first ECC decoder, or ii) transmitting the read data to the external device comprising the at least one second ECC decoder for decoding the read data. For example, if the result of the first ECC test shows that error bits in the read data are just a little over the capacity of the first ECC decoder, the memory controller may determine to proceed with option i). If the result of the first ECC test shows that error bits are much larger than the capacity of the first ECC decoder, the memory controller may determine to proceed with option ii).

Figure 6A:
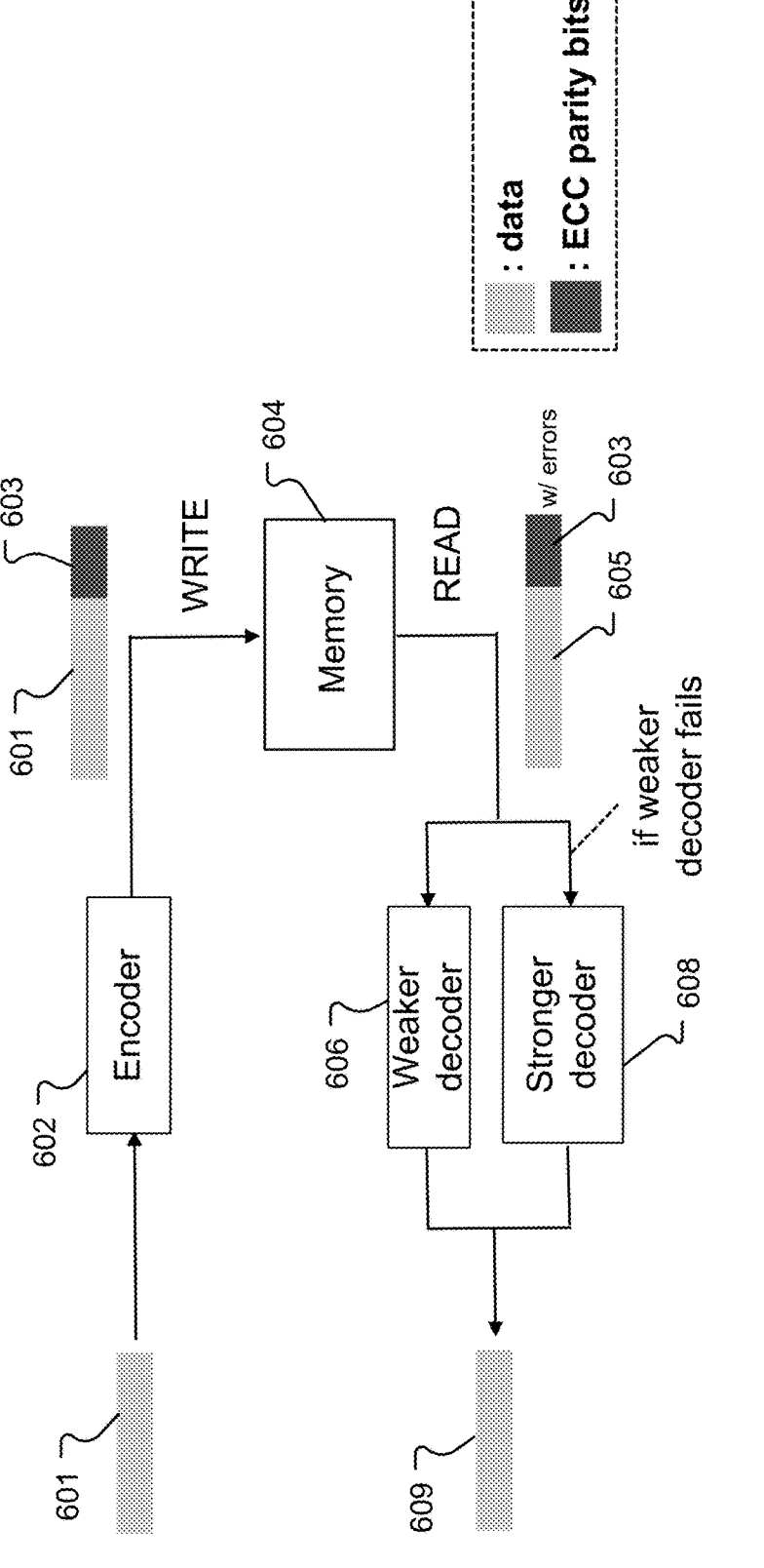
FIG. 6A is a schematic diagram of an example process of encoding data and decoding the data in a data storage system.
Figure 6B:
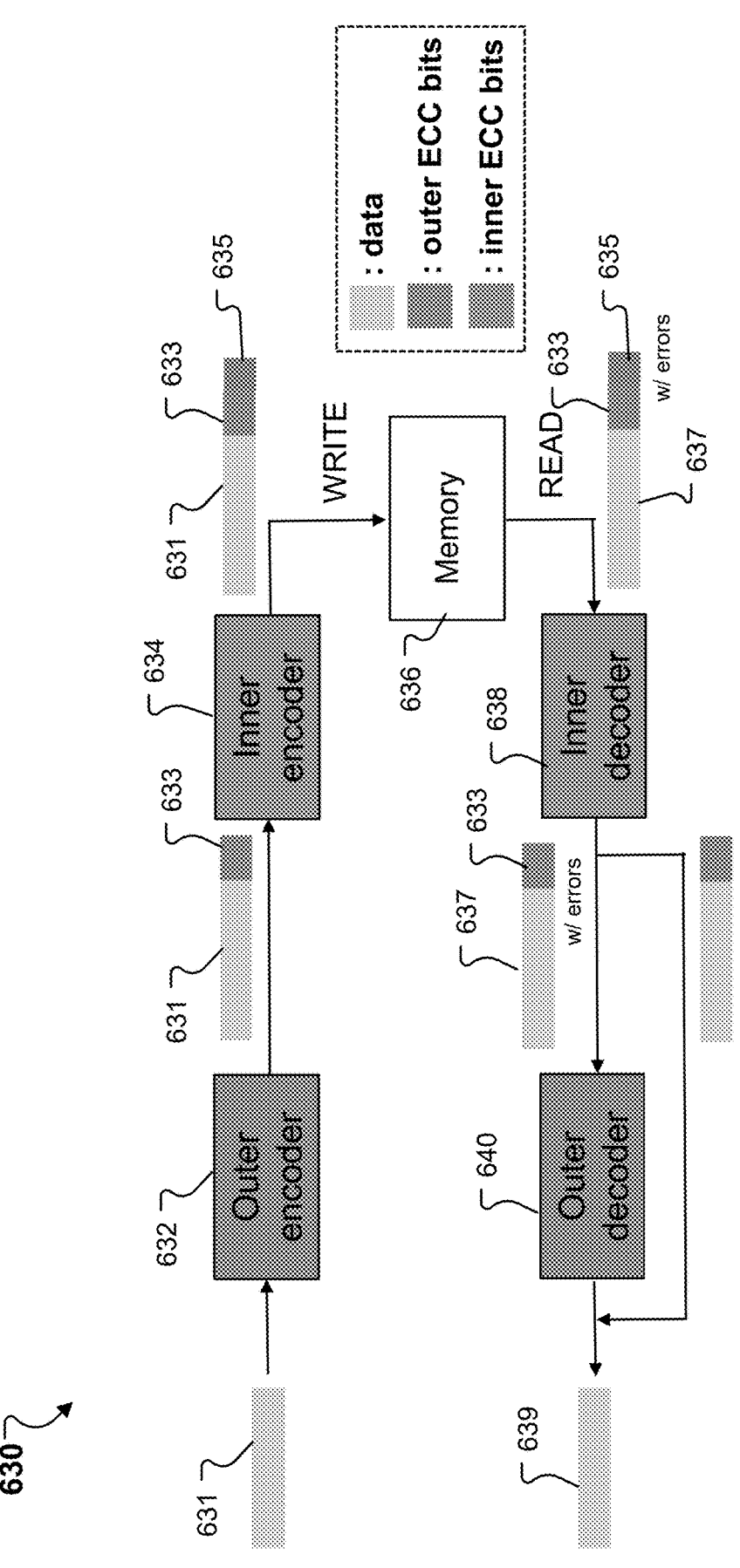
FIG. 6B is a schematic diagram of another example process of encoding data and decoding the data in a data storage system.
Figure 6C:
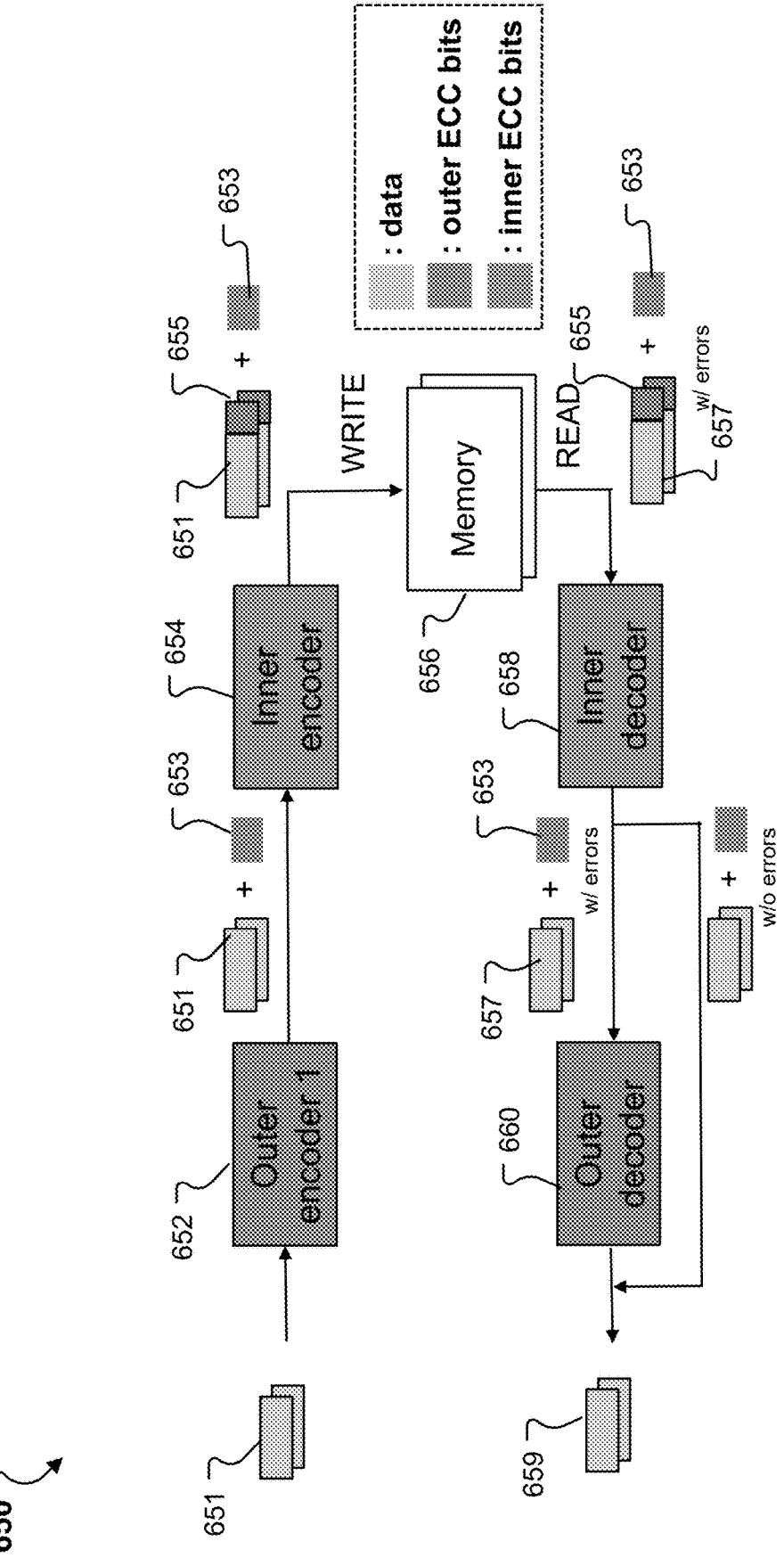
FIG. 6C is a schematic diagram of another example process of encoding data and decoding the data in a data storage system.

At step 518, the external device performs stronger ECC decoding on the read data using the at least one second ECC decoder, and determines whether the read data passes a second ECC test at step 520. In some implementations, the external device executes an ECC decoding operation on the read data using the at least one second ECC decoder. As discussed with further details in FIG. 6A, 6B, or 6C, the at least one second ECC decoder can perform the ECC decoding operation based on the first ECC data generated by the at least one first ECC decoder (e.g., as shown in FIG. 6A), or second ECC data generated based on the data to be read using a second ECC encoder in the external device or in the data storage device (e.g., as shown in FIG. 6B), or second ECC data generated based on multiple data portions of data to be read from multiple data storage devices using a second ECC decoder in the external device (e.g., as shown in FIG. 6C).

The external device can determine whether the read data passes the second ECC test by determining whether a number of error bits in the read data after the ECC decoding operation is smaller than a predetermined threshold. If the number of error bits is smaller than the predetermined threshold, the external device can determine that the read data passes the second ECC test. If the number of error bits is identical to or greater than the predetermined threshold, the external device determines that the read data fails to pass the second ECC test.

If the external device determines that the read data passes the second ECC test, at step 510, the external device returns corrected read data to the system controller that transmits the corrected read data to the host device. In some implementations, the external device transmits corrected read data back to the data storage device.

If the external device determines that the read data fails to pass the second ECC test, at step 522, the external device determines whether a number of times that the read data fails to pass the second ECC test is smaller than a predetermined threshold, e.g., by comparing a counter of the number of times to a predetermined number. If the number of times is smaller than the predetermined threshold, the external device can transmit a notification to the memory controller to i) change one or more parameters for reading the data again from the at least one memory or ii) perform soft decoding on the data, as shown in step 514. The counter can be increased by 1.

If the number of times reaches the predetermined threshold, at step 524, the external device can trigger a RAID (redundant array of independent disks) circuit to perform an error correction on the read data for data recovery. For example, the external device can send a message to the system controller, indicating to trigger the RAID circuit, and the system controller can trigger the RAID circuit accordingly. In some implementations, the RAID circuit can be included in the memory controller and configured to perform the error correction on the read data within the data storage device. In some implementations, the RAID circuit can be included in the system controller and configured to perform the error correction on the read data within the one or more data storage devices. The RAID circuit can be also in an accessory device (e.g., the accessory device 140 of FIG. 1A) external to the data storage devices and the system controller.

In some implementations, additional or alternative to step 522, in response to determining that the read data fails to pass the second ECC test and before triggering the RAID circuit, the external device can, based on a result of the second ECC test, perform one of: i) changing one or more parameters for reading the data from the at least one memory or performing soft decoding on the data, and performing again at least one of the first ECC test using the at least one first ECC decoder or the second ECC test using the at least one second ECC decoder, or ii) triggering the RAID circuit to perform the error correction on the read data. For example, if the result of the second ECC test shows that error bits in the read data are just a little over the capacity of the second ECC decoder, the external device may determine to proceed with option i). If the result of the second ECC test shows that error bits are much larger than the capacity of the second ECC decoder, the external device may determine to proceed with option ii).

In some implementations, the system controller is configured to generate an alert message for discarding the data storage device, based on at least one of a result of the first ECC test using the at least one first ECC decoder or a result of a second ECC test using the at least one second ECC decoder. For example, the data storage device can be designed to be cheap and discardable when the error bits are hard to be corrected by the first ECC decoder and/or the second ECC decoder.

FIGS. 6A-6C illustrate different examples of encoding data and decoding the data in a data storage system implemented in the present disclosure. The data storage system can be the data storage system 110 of FIG. 1A, the data storage system 200 of FIG. 2, the data storage system 300 of FIG. 3, or the data storage system 400 of FIG. 4. The data storage system can include a system controller and one or more data storage devices. The system controller can be, e.g., the system controller 112 of FIG. 1A, the system controller 202 of FIG. 2, the system controller 302 of FIG. 3, or the system controller 402 of FIG. 4. A data storage device can be, e.g., the data storage device 130 of FIG. 1A, the data storage device 150 of FIG. 1B, the data storage device 160 of FIG. 1C, the data storage device 210 of FIG. 2, the first data storage device 310 of FIG. 3, the second data storage device 320 of FIG. 3, or the data storage device 410 of FIG. 4.

FIG. 6A is a schematic diagram of an example process 600 of encoding data 601 and decoding the data in the data storage system, e.g., using same ECC data for weaker ECC decoders and stronger ECC decoders. The data storage device can include a memory controller and a memory 604. The memory controller can be, e.g., the memory controller 161 of FIG. 1C. The memory controller can include an ECC encoder 602 and a weaker ECC decoder 606. The weaker ECC decoder 606 can be, e.g., the ECC decoder 154 of FIG. 1B or 1C, the ECC decoder 214 of FIG. 2, the ECC decoder 314 of FIG. 3, or the ECC decoder 414 of FIG. 1C.

The ECC encoder 602 can encode the data 601 to generate ECC data 603 (e.g., ECC parity bits). The memory controller can write the data 601 together with the ECC data 603 in the memory 604. The data 601, together with the ECC data 603, can be read from the memory 604, e.g., in response to a read command from the system controller. Read data 605 can have error bits.

As discussed above, the weaker ECC decoder 606 in the data storage device can first decode the read data 605 based on the ECC data 603. If the weaker ECC decoder 606 fails to decode the read data 605, the memory controller can transmit the read data 605 and the ECC data 603 to an external device including a stronger ECC decoder 608 that has a stronger ECC capability than the weaker ECC decoder 606. The external device can be, e.g., the external device 170 of FIG. 1D, the external device 220 of FIG. 2, the second data storage device 320 of FIG. 3, or the external device 420 of FIG. 4 in the system controller. The stronger ECC decoder 608 can be, e.g., the second ECC decoder 156 of FIG. 1B, the second ECC decoder 156 of FIG. 1D, the stronger ECC decoder 222 of FIG. 2, the stronger ECC decoder 326 of FIG. 2, or the stronger ECC decoder 422 of FIG. 4. The stronger ECC decoder 608 can decode the read data 605 based on the ECC data 603 to generate corrected read data 609.

In some implementations, bit-flipping based LDPC decoders (as low-power decoding mode) and Min-sum LDPC decoders (as stronger decoding mode) are implemented as a pair of the weaker ECC decoder 606 and the stronger ECC decoder 608. As shown in FIG. 6A, only one encoder 602 is used for both modes, and the ECC data 603 (e.g., ECC parity bits) are shared for both the weaker ECC decoder 606 and the stronger ECC decoders 608.

FIG. 6B is a schematic diagram of another example process 630 of encoding data and decoding the data in the data storage system. Different from the process 610 in FIG. 6A, the process 630 involves two different ECC data. In some implementations, a memory controller in the data storage device can include an inner encoder 634 and an inner ECC decoder 638. An external device can include an outer encoder 632 and an outer ECC decoder 640. In some implementations, the memory controller includes the inner encoder 634, the outer encoder 632, and the inner ECC decoder 638, while the external device includes only the outer ECC decoder 640. The inner encoder 634 can correspond to the inner ECC decoder 638, while the outer encoder 642 can correspond to the outer ECC decoder 640. The inner ECC decoder 638 is configured to decode data using ECC data generated by the inner encoder 634, and the outer ECC decoder 640 is configured to decode data using ECC data generated by the outer encoder 642.

The external device can be, e.g., the external device 170 of FIG. 1D, the external device 220 of FIG. 2, the second data storage device 320 of FIG. 3, or the external device 420 of FIG. 4 in the system controller. The outer ECC decoder 640 can have a higher ECC capability than the inner ECC decoder 638. The inner ECC decoder 638 can be a weaker decoder, e.g., the ECC decoder 154 of FIG. 1B or 1C, the ECC decoder 214 of FIG. 2, the ECC decoder 314 of FIG. 3, or the ECC decoder 414 of FIG. 1C. The outer ECC decoder 640 can be a stronger decoder, e.g., the second ECC decoder 156 of FIG. 1B, the second ECC decoder 156 of FIG. 1D, the stronger ECC decoder 222 of FIG. 2, the stronger ECC decoder 326 of FIG. 2, or the stronger ECC decoder 422 of FIG. 4.

Data 631 to be stored in a memory 636 of the data storage device can be first encoded by the outer encoder 632 to generate outer ECC data 633 (e.g., outer ECC parity bits). Then the external device can transmit the data 631 together with the ECC data 633 to the data storage device. The inner encoder 634 can encode the data 631 to generate inner ECC data 635 (e.g., inner ECC parity bits). The memory controller can store the data 631 together with the outer ECC data 633 and the inner ECC data 635 in a memory 636 of the data storage device. The memory controller can store the inner ECC data 635 and the outer ECC data as concatenated codes of the data 631 in the memory 636. The inner ECC decoder 638 can cover most read requests, and the outer ECC decoder 640, which is stronger with the cost of longer latency and more power consumption, can be seldom executed.

The memory controller can read the data 631, together with the outer ECC data 633 and the inner ECC data 635 from the memory 636, to obtain read data 637 that may include error bits. The memory controller can decode the read data 637 using the inner ECC decoder 638, e.g., as described in FIG. 5. If the inner ECC decoder 638 successfully decodes the read data 637 using the inner ECC data 635, the memory controller generates corrected read data 639. If the inner ECC decoder 638 fails to decode the read data 637 using the inner ECC data 635, the memory controller can transmit the read data 637 and the outer ECC data 633 to the external device. The outer ECC decoder 640 in the external device can then decode the read data 637 based on the outer ECC data 633 to generate corrected read data 639.

FIG. 6C is a schematic diagram of another example process 650 of encoding data and decoding the data in the data storage system. Different from the process 630 in FIG. 6B, the process 650 involves storing multiple data portions of data into multiple data storage devices in the data storage system.

In some implementations, each of the multiple data storage devices includes a memory controller (e.g., the memory controller 161 of FIG. 1C) and a corresponding memory 656. The memory controller in the data storage device can include an inner ECC encoder 654 and an inner ECC decoder 658. An external device can include an outer ECC encoder 652 and an outer ECC decoder 660. The inner ECC encoder 654 can correspond to the inner ECC decoder 658, while the outer ECC encoder 652 can correspond to the outer ECC decoder 660. The inner ECC decoder 658 is configured to decode data using ECC data generated by the inner ECC encoder 654, and the outer ECC decoder 660 is configured to decode data using ECC data generated by the outer ECC encoder 652.

The external device can be, e.g., the external device 170 of FIG. 1D, the external device 220 of FIG. 2, the second data storage device 320 of FIG. 3, or the external device 420 of FIG. 4 in the system controller. The outer ECC decoder 660 can have a stronger ECC capability than the inner ECC decoder 658. The inner ECC decoder 658 can be a weaker decoder, e.g., the ECC decoder 154 of FIG. 1B or 1C, the ECC decoder 214 of FIG. 2, the ECC decoder 314 of FIG. 3, or the ECC decoder 414 of FIG. 1C. The outer ECC decoder 660 can be a stronger ECC decoder, e.g., the second ECC decoder 156 of FIG. 1B, the second ECC decoder 156 of FIG. 1D, the stronger ECC decoder 222 of FIG. 2, the stronger ECC decoder 326 of FIG. 2, or the stronger ECC decoder 422 of FIG. 4.

Multiple data portions 651 of data to be stored in multiple data storage devices can be first encoded by the outer encoder 652 in the external device to generate outer ECC data 653 (e.g., outer ECC parity bits) for the multiple data portions 651 of the data. Then, each data portion 651 and the outer ECC data 653 can be transmitted to a corresponding data storage device of the multiple data storage devices, e.g., by the external device or by the system controller. The inner encoder 654 in the corresponding data storage device can encode the data portion 651 to generate inner ECC data 655 (e.g., inner ECC party bits) for the data portion 651. The memory controller in the corresponding data storage device can store the data portion 651 of the data, together with the inner ECC data 655 and the outer ECC data 653, into the memory 656 of the corresponding data storage device.

In response to receiving a read request from a host device (e.g., the host device 120 of FIG. 1A), the system controller can transmit a read command to each of the multiple data storage devices. For each of the multiple data storage devices, the memory controller can read a corresponding data portion 651 of the data, together with corresponding inner ECC data 655 and the outer ECC data 653, from the memory 656. The inner ECC decoder 658 first decodes a read corresponding data portion 657 based on the corresponding inner ECC data 655. If the inner ECC decoder 655 successfully decodes the read corresponding data portion 657 using the inner ECC data 655, the memory controller generates corrected read data portion 659. If the inner ECC decoder 658 fails to decode the read corresponding data portion 657 using the inner ECC data 655, the memory controller can transmit the read corresponding data portion 657 and the outer ECC data 653 to the external device. The outer ECC decoder 660 in the external device can then decode the read corresponding data portion 657 based on the outer ECC data 653 to generate corrected read corresponding data portion 659.

In the process 650, product codes can be implemented using pairs of weaker and stronger ECC encoders and decoders. The two types of ECC encoders 652, 654 generate two types of parity bits, e.g., inner ECC data for a corresponding data portion and outer ECC data for multiple data portions of the data or the whole data. Both encoding and decoding of the outer (stronger) ECC are executed by the external device. Both encoding and decoding of inner (weaker or lower-power) ECC are executed inside a single data storage device. The inner ECC decoders can cover most read requests, and the outer ECC decoder, which is stronger with the cost of longer latency and more power consumption, can be seldom executed.

The disclosed and other examples can be implemented as one or more computer program products, for example, one or more modules of computer program instructions encoded on a computer readable medium for execution by, or to control the operation of, data processing apparatus. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform the functions described herein. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, flash memory devices, and magnetic disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

The invention claimed is:

1. A data storage system, comprising:
one or more data storage devices; and
a system controller coupled to the one or more data storage devices,
wherein the one or more data storage devices comprise a data storage device having at least one memory and a memory controller coupled to the at least one memory, the memory controller comprising at least one first Error-Correcting Code (ECC) decoder,
wherein the memory controller is configured to:
read data from the at least one memory,
perform a first ECC test on the read data using the at least one first ECC decoder, and
in response to determining that the read data fails to pass the first ECC test, transmit the read data to an external device having at least one second ECC decoder for decoding the read data,
wherein the external device is external to the data storage device and the at least one second ECC decoder has a stronger ECC capability than the at least one first ECC decoder, and

wherein the memory controller is configured to:

in response to determining that the read data fails to pass the first ECC test and before transmitting the read data to the at least one second ECC decoder, and based on a result of the first ECC test, perform one of:

i) changing one or more parameters for reading the data from the at least one memory or performing soft decoding on the data, and performing the first ECC test again using the at least one first ECC decoder, or ii) transmitting the read data to the external device comprising the at least one second ECC decoder for decoding the read data.

2. The data storage system of claim 1, wherein the memory controller is configured to:

in response to determining that the read data fails to pass the first ECC test and before transmitting the read data to the external device, determine whether a number of times that the read data fails to pass the first ECC test is smaller than a predetermined threshold, if the number of times is smaller than the predetermined threshold, change one or more read parameters to read the data again from the at least one memory or perform soft decoding on the data, and if the number of times reaches the predetermined threshold, transmit the read data to the external device comprising the at least one second ECC decoder for decoding the read data.

3. The data storage system of claim 1, wherein the external device is configured to:

perform a second ECC test on the read data using the at least one second ECC decoder, and in response to determining that the read data passes the second ECC test, transmit corrected read data to the system controller.

4. The data storage system of claim 3, wherein the external device is configured to:

in response to determining that the read data fails to pass the second ECC test, determine whether a number of times that the read data fails to pass the second ECC test is smaller than a predetermined threshold, if the number of times is smaller than the predetermined threshold, transmit a notification to the memory controller to i) change one or more parameters for reading the data from the at least one memory or ii) perform soft decoding on the data, and if the number of times reaches the predetermined threshold, trigger a RAID (redundant array of independent disks) circuit to perform an error correction on the read data.

5. The data storage system of claim 3, wherein the external device is configured to:

in response to determining that the read data fails to pass the second ECC test and before triggering a RAID circuit, and based on a result of the second ECC test, perform one of:

i) changing one or more parameters for reading the data from the at least one memory or performing soft decoding on the data, and performing again at least one of the first ECC test using the at least one first ECC decoder or the second ECC test using the at least one second ECC decoder, or ii) triggering the RAID circuit to perform the error correction on the read data.

6. The data storage system of claim 1, wherein the memory controller is configured to:

24 execute an ECC decoding operation on the read data using the at least one first ECC decoder;

determine whether a number of error bits in the read data after the ECC decoding operation is smaller than a predetermined threshold;

if the number of error bits is smaller than the predetermined threshold, determine that the read data passes the first ECC test; and if the number of error bits is identical to or greater than the predetermined threshold, determine that the read data fails to pass the first ECC test.

7. The data storage system of claim 1, wherein the one or more data storage devices comprising:

one or more first data storage devices each comprising only one or more first ECC decoders, and one or more second data storage devices each comprising one or more first ECC decoders and one or more second ECC decoders.

8. The data storage system of claim 7, wherein the system controller is configured to:

store a first type of data in the one or more first data storage devices, and store a second type of data in the one or more second data storage devices, wherein the first type of data is configured to be read more frequently than the second type of data.

9. The data storage system of claim 7, wherein the one or more first data storage devices and the one or more second data storage devices are configured to operate under a protocol, where each of the one or more first data storage devices is configured to, in response to determining that the one or more first ECC decoders in the first data storage device fails to correct first data read from a corresponding first memory, transmit the read first data to one of the one or more second data storage devices, and wherein each of the one or more second data storage devices is configured to, in response to receiving corresponding read data from one of the one or more first data storage devices, decode the corresponding read data using the one or more second ECC decoders in the second data storage device.

10. The data storage system of claim 1, wherein the external device is included in the system controller.

11. The data storage system of claim 1, wherein the memory controller comprises a first ECC encoder configured to encode the data to generate first ECC data, and the memory controller is configured to store the data together with the first ECC data in the at least one memory, and wherein the at least one first ECC decoder is configured to decode the read data based on the first ECC data, and wherein the at least one second ECC decoder is configured to decode the read data based on the first ECC data.

12. The data storage system of claim 1, wherein the memory controller comprises a first ECC encoder configured to encode the data to generate first ECC data, and the external device comprises a second ECC encoder configured to encode the data to generate second ECC data, wherein the memory controller is configured to:

store the data together with the first ECC data and the second ECC data in the at least one memory, read the data together with the first ECC data and the second ECC data from the at least one memory, and in response to determining that the read data fails to pass the first ECC test, transmit the read data and the second ECC data to the external device having at least one second ECC decoder, and wherein the at least one first ECC decoder is configured to decode the read data based on the first ECC data, and wherein the at least one second ECC decoder is configured to decode the read data based on the second ECC data received from the memory controller.

13. The data storage system of claim 1, wherein the system controller is configured to transmit multiple portions of particular data respectively to multiple data storage devices of the one or more data storage devices, wherein each of the multiple data storage devices comprises a first ECC encoder and one or more first ECC decoders, and the first ECC encoder is configured to encode a corresponding portion of the particular data to generate corresponding first ECC data, wherein the external device comprises a second ECC encoder configured to encode the multiple portions of the particular data to generate second ECC data, wherein each of the multiple data storage devices comprises a memory controller configured to store the corresponding portion of the particular data together with the corresponding first ECC data and the second ECC data in a corresponding memory, wherein, for each of the multiple data storage devices, the one or more first ECC decoders are configured to decode the corresponding portion of the particular data from the corresponding memory based on the corresponding first ECC data, and wherein the at least second ECC decoder in the external device is configured to: in response to receiving a portion of the particular data from one of the multiple data storage devices and the second ECC data, decode the portion of the particular data based on the second ECC data.

14. A data storage device, comprising:

at least one memory; and a memory controller coupled to the at least one memory, the memory controller comprising at least one first Error-Correcting Code (ECC) decoder, wherein the memory controller is configured to:

read data from the at least one memory, perform a first Error-Correcting Code (ECC) test on the read data using the at least one first ECC decoder, and in response to determining that the read data fails to pass the first ECC test, transmit the read data to an external device having at least one second ECC decoder for decoding the read data, wherein the external device is external to the data storage device and the at least one second ECC decoder has a stronger ECC capability than the at least one first ECC decoder, and wherein the memory controller is configured to:

in response to determining that the read data fails to pass the first ECC test and before transmitting the read data to the external device, determine whether a number of times that the read data fails to pass the first ECC test is smaller than a predetermined threshold, if the number of times is smaller than the predetermined threshold, change one or more read parameters to read the data again from the at least one memory or perform soft decoding on the data, and if the number of times reaches the predetermined threshold, transmit the read data to the external device comprising the at least one second ECC decoder for decoding the read data.

15. The data storage device of claim 14, wherein the memory controller is configured to:

in response to determining that the read data fails to pass the first ECC test and before transmitting the read data to the at least one second ECC decoder, and based on a result of the first ECC test, perform one of:

i) changing one or more parameters for reading the data from the at least one memory or performing soft decoding on the data, and performing the first ECC test again using the at least one first ECC decoder, or ii) transmitting the read data to the external device comprising the at least one second ECC decoder for decoding the read data.

16. The data storage device of claim 14, wherein the memory controller is configured to:

execute an ECC decoding operation on the read data using the at least one first ECC decoder;

determine whether a number of error bits in the read data after the ECC decoding operation is smaller than a predetermined threshold;

if the number of error bits is smaller than the predetermined threshold, determine that the read data passes the first ECC test; and if the number of error bits is identical to or greater than the predetermined threshold, determine that the read data fails to pass the first ECC test.

17. A device, comprising:

at least one first Error-Correcting Code (ECC) decoder externally coupled to at least one data storage device that comprises at least one memory configured to store data, wherein the at least one data storage device comprises at least one second ECC decoder, the at least one first ECC decoder having a stronger ECC capability than the at least one second ECC decoder, and wherein the at least one first ECC decoder is configured to:

in response to receiving read data from the at least one data storage device, perform an ECC test on the read data using the at least one first ECC decoder, and in response to determining that the read data passes the ECC test, generate corrected read data for the at least one data storage device; and a first ECC encoder configured to encode the data to generate first ECC data and transmit the first ECC data to the at least one data storage device, wherein the at least one data storage device comprises a second ECC encoder configured to encode the data to generate second ECC data.

18. The device of claim 17, wherein the at least one second ECC decoder is configured to decode the read data based on ECC data associated with the data stored in the at least one memory, and wherein the at least one first ECC decoder is configured to decode the read data based on the ECC data.

19. The device of claim 17, wherein the at least one data storage device is configured to:

store the data together with the first ECC data and the second ECC data in the at least one memory, read the data together with the first ECC data and the second ECC data from the at least one memory, and in response to determining that the at least one second ECC decoder fails to decode the read data based on the second ECC data, transmit the read data and the first ECC data to the at least one first ECC decoder, and wherein the at least one first ECC decoder is configured to:

in response to receiving the read data and the first ECC data from the at least one data storage device, decode the read data based on the first ECC data.

20. The device of claim 17, wherein the data comprises multiple portions, and the at least one data storage device comprises multiple data storage devices configured to respectively store the multiple portions, wherein the first ECC encoder is configured to encode the multiple portions of the data to generate first ECC data and transmit the first ECC data to each of the multiple data storage devices, wherein each of the multiple data storage devices comprises a respective second ECC encoder configured to encode a corresponding portion of the data to generate corresponding second ECC data, wherein each of the multiple data storage devices is configured to store the corresponding portion of the data together with the corresponding second ECC data and the first ECC data in a corresponding memory, and wherein the at least first ECC decoder is configured to: in response to receiving a portion of the data from one of the multiple data storage devices and the first ECC data, decode the portion of the data based on the first ECC data.

* * * * *